(12) United States Patent
Singers et al.

(10) Patent No.: US 6,341,900 B1
(45) Date of Patent: Jan. 29, 2002

(54) METHOD AND APPARATUS FOR DISPLAYING OPERATIONAL INFORMATION OF A CONTROL SYSTEM BY A STARFIELD DISPLAY

(75) Inventors: Robert R. Singers, Brown Deer; Linda S. Endres, Milwaukee, both of WI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 08/382,508

(22) Filed: Feb. 2, 1995

(51) Int. Cl.[7] ............................................... G06T 11/00
(52) U.S. Cl. ...................................................... 395/140
(58) Field of Search ........................ 395/140, 99, 155, 395/159, 160, 161, 903–910

(56) References Cited

U.S. PATENT DOCUMENTS 5,404,440 A * 4/1995 Asahi ........................ 395/155

OTHER PUBLICATIONS

Metaphoric Abstraction: the Starfield and Complex Systems—R.R. Singers and L. S. Endres—Johnson Controls, Inc., Sep. 18, 1994.

* cited by examiner

*Primary Examiner*—Almis R. Jankus
(74) *Attorney, Agent, or Firm*—Foley & Lardner (57) ABSTRACT

A control system includes a plurality of sensors configured to produce a plurality of sensor signals in response to a sensed condition; a plurality of controllers configured to produce a plurality of control signals in response to one or more sensor signals; a plurality of operational units, each respective operational unit receiving one or more control signals, each respective operational unit configured to produce a control effect in response to the one or more control signals; and a display device which produces a starfield display in response to the plurality of sensor signals and the plurality of control signals. The starfield display conveys operational information about the control system to an operator.

23 Claims, 2 Drawing Sheets

METHOD AND APPARATUS FOR DISPLAYING OPERATIONAL INFORMATION OF A CONTROL SYSTEM BY A STARFIELD DISPLAY

FIELD OF THE INVENTION

The present invention relates generally to a method and apparatus for displaying operational information in a control system. Operational information is displayed using a starfield display as a metaphoric abstraction of system operation. In a particular embodiment of the invention, information pertaining to the operation of a facility management system is abstracted and displayed in a starfield display.

BACKGROUND OF THE INVENTION

Control systems generally include one or more sensors, an operational unit and a controller. The sensors detect a condition, such as a temperature, a pressure, humidity, or an operational status, such as on or off, air velocity, etc. The operational unit includes equipment, such as a heater or chiller or a pump, capable of changing the detected condition. The controller receives a signal from the sensors and provides a control signal to the operational unit to control the operational unit. Commonly, in a negative feedback loop, the operational unit is operated to maintain the condition at a predetermined setpoint or within a predetermined range. The controller determines a difference between the signal from the sensor and the setpoint and controls the operational unit to reduce or eliminate the difference to obtain the desired setting for the condition.

One example of a control system is a facility management system. Such systems control a building's heating, ventilating, air conditioning, lighting, security and fire systems. Conditions such as temperature and humidity are detected by sensors such as temperature and humidity sensors. These conditions are controlled using operational units such as chillers, boilers and fans. Such facility management systems may include 400,000 or more sensed and controlled parameters. Operation of such a system is under the control of a process manager or the researcher.

Complex systems, such as facility management systems, can generate substantial quantities of data that could easily overwhelm a process manager. A process manager, monitoring such a complex system needs to identify potential or actual operational problems in the system and respond to solve the problems in a timely manner. Also, during research and simulation of complex systems, the researcher needs to identify similar potential or actual problems. To do this, operational information must be displayed in a manner which is clearly understood and utilized by the process manager.

Graphic interfaces developed for displaying control information in facility management systems are illustrative of prior art methods and devices for displaying operational information in complex control systems. In the 1960's, process control and facility management systems used mimic panels located throughout a facility. These mimic panels consisted of dials, gauges, valves and switches mounted on large panels painted with electrical, plumbing, process or HVAC (heating, ventilation and air conditioning) duct diagrams. System operation was monitored by touring the plant and monitoring the individual panels.

In the early 1970's, these hard-wired panels were replaced with centrally located minicomputers and text display cathode ray tubes (CRTs). This allowed for a concentration of sensor data and thus savings in time for personnel who no longer had to walk around the plant or buildings, recording and checking system data panels. To present relationships between the data and the elements of the monitored system, projectors would display slides of the pictures which were formerly on the mimic panels. Thus, a single sensor, single indicator (SSSI) paradigm was maintained. The static signal which represented function or location was displayed on the slide with the assigned name while the name and the current value was on the CRT. The operator was expected to view the projector and the display to determine the relationship between the sensor's function or location and its value.

Color CRTs were introduced in the late 1970's, but these merely replaced the slide projector with dynamic values overlaying the static picture. This made the display two levels deep: a static portion or background level, representing functional or locational references, and a dynamic portion or foreground level displaying the current sensor values. As technology improved, changes were made to the dynamic portion of the display. Color was added to indicate the status of the sensor (alarm or normal) or a switch state (on or off). Analog values were represented with a bar graph element which showed relative values with respect to an upper bound and a lower bound. Limits were also added so the operator could determine how closely a monitored condition was maintained to a setpoint. The equipment signals were moved to the dynamic portion and were also color-coded. For example, a pump symbol was coded green if on and red if off. Flashing symbols added another level of information. Multiple symbols were alternated on the display to give the illusion of animation. Direct manipulation techniques were added, allowing the operator to "click on" the fan symbol to change its state or to "click and drag" the setpoint indicator on an analog bar graph to change the setpoint value. Other techniques were added to allow penetration beyond the display to detailed graphics or text views. All of these techniques improved the effectiveness of the displayed information, allowed more sensors to be monitored and reduced some of the cognitive load on the operator. The paradigm remained that of a single sensor, single indicator.

However, in modern, complex control systems, the number of sensed and controlled parameters has continued to grow. Some complex systems may have 400,000 such parameters, and future systems will certainly have even more. Prior art display systems will not enable a process manager to effectively monitor large numbers of parameters. Moreover, prior art techniques are still tied to the location and function diagrams of the physical system. To move beyond these diagrams, and to allow the system to accommodate even greater levels of complexity, it is necessary to provide an abstract representation of the physical data.

An abstract representation of the data would allow the data and relationships among the data points to be more effectively presented. By observing visual attributes in an abstracted display, as well as patterns and changes in the display, an operator could monitor a greater amount of data. The operator could also determine relationships between operational parameters of individual components of the control system. Through experience with starfield displays produced in response to a variety of conditions, the operator could readily identify operational problems before they occur and act to correct potential problems.

SUMMARY OF THE INVENTION

The present invention provides a control system comprising a plurality of sensors producing a plurality of sensor signals. Each respective sensor produces a respective sensor signal in response to a respective sensed condition. The control system further comprises a plurality of controllers producing a plurality of control signals in response to one or more of the sensor signals, each respective controller producing at least one control signal. The control system further comprises a plurality of operational units, each respective operational unit being connected to a respective controller for receiving one or more control signals, each respective operational unit producing a control effect in response to one or more control signals. Still further, the control system comprises a display device connected to the plurality of sensors and the plurality of controllers and producing a starfield display in response to the plurality of sensor signals and the plurality of control signals.

The invention further provides a method for providing operational information in a facility management system, the facility management system including a plurality of functional units, a controller, and a display device. The method comprises the steps of receiving from at least one functional unit a sensor signal representative of the sensed condition and producing a starfield display on the display device in response to the sensor signal.

The invention still further provides a facility management system including one or more sensors responsive to an environmental condition and configured to produce a sensor signal, one or more fans responsive to a control signal configured to change the environmental condition, and a controller configured to be coupled to the one or more sensors and the one or more fans, the controller configured to generate the control signal in response to the sensor signal. The facility management system further includes a display device configured to be coupled to the one or more sensors and to the controller, the display device configured to produce a starfield display in response to the sensor signal and the control signal.

BRIEF DESCRIPTION OF THE DRAWINGS

The invention, together with further objects and advantages thereof, may best be understood by making reference to the following description taken in conjunction with the accompanying drawings, and the several figures of which like reference numerals identify identical elements, and wherein.

DETAILED DESCRIPTION OF THE PREFERRED EMBODIMENT

Figure 1:
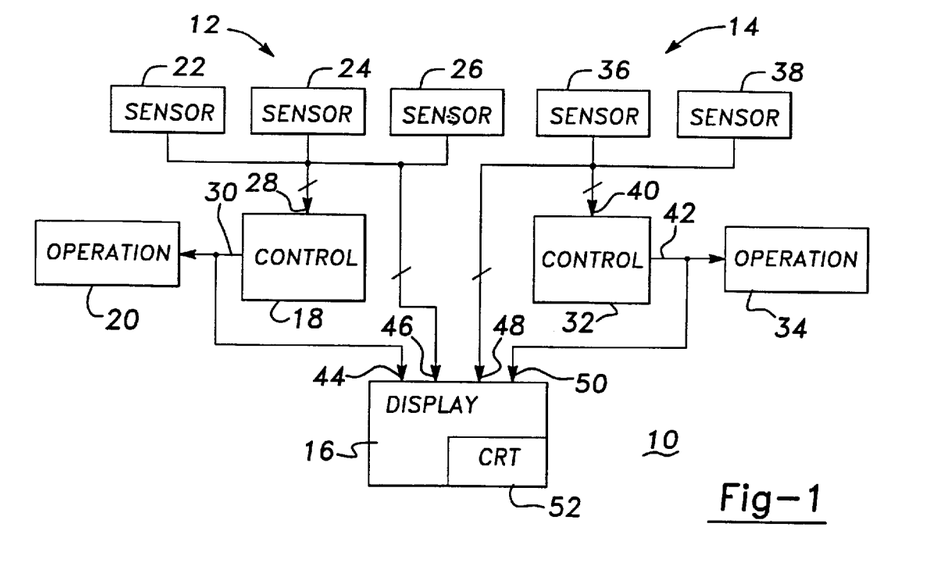
FIG. 1 is a functional block diagram illustrating a control system.

Referring now to FIG. 1, a control system 10 includes a first functional unit 12, a second functional unit 14 and a display device 16. As illustrated in FIG. 1, the control system 10 includes two functional units. However, as will be understood by those ordinarily skilled in the art, the system 10 could include any number of functional units.

The control system 10 may be any system for monitoring and controlling a condition. One example is a facility management system which manages heating, cooling, air flow, lighting, security and fire detection in a building. However, it is to be understood that the system 10 could be any control system, and particularly a control system in which a large number of sensors and controllers must be monitored.

The first functional unit 12 includes a controller 18, an operational unit 20, a first sensor 22, a second sensor 24 and a third sensor 26. The sensors 22, 24, 26 detect a condition such as a temperature, a pressure, humidity, air velocity or an operational status, such as on or off. The sensors 22, 24, 26 provide a sensor signal, representative of the detected condition, to an input 28 of the controller 18. The sensor signal may be a voltage or current or a mechanical, optical or other interaction, and may consist of a group of signals associated with the respective sensors 22, 24, 26. In response to the sensor signal, the controller 18 provides a control signal at an output 30 to the operational unit 20. The operational unit 20 responds to the control signal to vary the condition detected by the sensors 22, 24, 26.

The second functional unit 14 operates similarly to the first functional unit 12. The second functional unit 14 includes a controller 32, an operational unit 34, a first sensor 36 and a second sensor 38. The sensors 36, 38 detect a condition, which may be the same as or different from the conditions detected by the sensors 22, 24, 26 associated with the first functional unit 12. In response to the detected condition, the sensors 36, 38 provide a sensor signal to an input 40 of the controller 32. The sensor signal may be a voltage or current or a mechanical interaction, and may consist of a group of more than one individual signal associated with the respective sensors 36, 38. In response to the sensor signal, the controller 32 provides a control signal at an output 42 to the operational unit 34. The control signal may be an electrical, mechanical or other type of signal. In response to the control signal, the operational unit 34 produces an effect to vary the conditions detected by the sensors 36, 38.

The display device 16 has a first input 44 coupled to the output 30 of the controller 18 for receiving the control signal produced by the controller 18. The display device 16 further has a second input 46 coupled to the sensors 22, 24, 26 for receiving the sensor signals produced by the sensors 22, 24, 26 and provided to the controller 18. Similarly, the display device 16 has a third input 48 coupled to the sensors 36, 38 for receiving the sensor signals produced by the sensors 36, 38 and provided to the controller 32, and a fourth input 50 coupled to the output 42 of the controller 32 for receiving the control signal produced by the controller 32. The display device 16 includes a cathode ray tube (CRT) 52 for producing a graphical display in response to the signals received at the inputs 44, 46, 48, 50. The display device 16 could alternatively include any type of device for producing a graphical display, such as a flay panel display, liquid crystal display (LCD), printer, plotter, etc. The display device 16 could also include a microprocessor or other controller (not illustrated in FIG. 1) for controlling the display device 16 and producing a graphical display on the CRT 52.

The display device 16 receives the sensor signals and the control signals produced by the first functional unit 12 and the second functional unit 14 and produces a starfield display illustrating operation of the system. The starfield display will be discussed in detail in conjunction with FIGS. 3–5 below.

In operation, the first functional unit 12 and the second functional unit 14 preferably implement negative feedback control loops, such as proportional-integral or proportional-integral-derivative control loops, as are well known in the art. Thus, the functional units 12, 14 operate to maintain the condition detected by the sensors 22, 24, 26 and sensors 36, 38 at or near a predetermined setpoint condition. The setpoints may be the same or different.

The system 10 illustrated in FIG. 1 is a distributed system in that each functional unit 12, 14 includes a controller. However, the controllers 18, 32 could be replaced by a single controller which is in communication with all functional units. Similarly, the display device illustrated in FIG. 1 could be replaced by a plurality of display devices, each in communication with one or more functional units.

Figure 2:
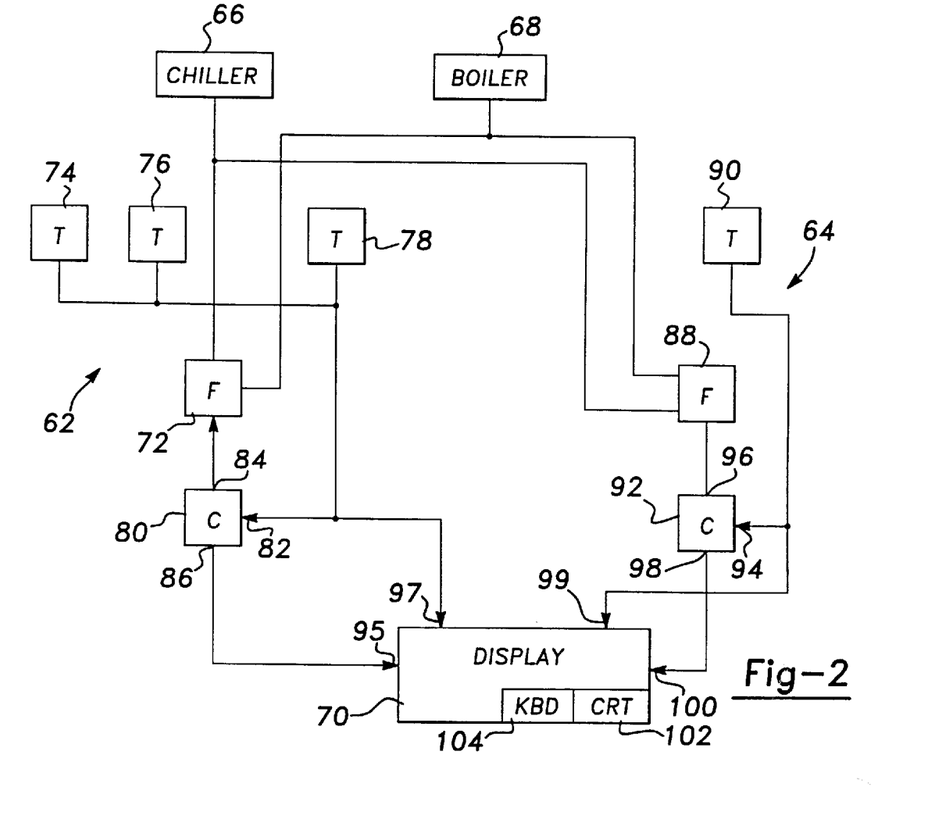
FIG. 2 is a functional block diagram of a facility management system.

One exemplary embodiment of a complex control system such as the control system 10 is a facility management system. FIG. 2 illustrates a functional block diagram of a facility management system 60. Facility management systems in general control a building's heating, ventilating and air conditioning, lighting, security and fire systems. For controlling heating, ventilating, and air conditioning, a facility management system includes one or more fan systems. Each fan system includes one or more fans for circulating air in a specific space or area of the building and one or more sensors for sensing environmental conditions such as temperature or relative humidity in the area.

The area may be divided into zones, with one or more sensors monitoring each zone. In FIG. 2, the facility management system 60 includes a first fan system 62 and a second fan system 64. The facility management system 60 further includes a chiller 66, a boiler 68 and a display device 70. However, as will be understood by those ordinarily skilled in the art, the facility management system 60 could include many fan systems. Thus, the facility management system 60 could include, for example, as many as 400,000 or more sensed and controlled points. In addition to fan systems, the facility management system 60 could include other types of systems, such as fire systems, security systems and lighting systems. Operational information for each of these systems may also be displayed on the display device 70 in the manner to be described.

The first fan system 62 includes a fan 72, a first temperature sensor 74, a second temperature sensor 76, a third temperature sensor 78 and a controller 80. The controller 80 includes an input 82 for receiving a temperature sensor signal from the temperature sensors 74, 76, 78. The controller 80 further includes an output 84 for providing a control signal to the fan 72. The temperature sensor signal is preferably an electrical signal and may include a plurality of signals. The control signal is also preferably an electrical signal and may also include a plurality of signals. The controller 80 may also include a second output 86 for providing the control signal, the sensor signal, or both to the display device 70. Alternatively, the sensor signal may be provided directly to the display device 70 as is illustrated in the case of the sensor signal provided at input 97 in FIG. 2.

The second fan system 64 includes a fan 88, a temperature sensor 90 and a controller 92. The controller 92 includes an input 94 for receiving a sensor signal from the temperature sensor 90 and an output 96 for providing a control signal to the fan 88. The temperature sensor signal is preferably an electrical signal and may include a plurality of signals. The control signal is also preferably an electrical signal and may also include a plurality of signals. In addition, the controller 92 may also include a second output 98 for providing the sensor signal, the control signal, or both to the display device 70. Alternatively, the sensor signal may be provided directly to a display device, as is illustrated in the case of the sensor signal provided at input 99 in FIG. 2.

The display device 70 includes a first input 95 coupled to the output 86 of the controller 80 for receiving the control signal, the sensor signals or both from the controller 80. The display device 70 further includes a second input 97 for receiving the sensor signal from the temperature sensors 74, 76, 78. Similarly, the display device 70 includes a third input 99 for receiving the sensor signal from the temperature sensor 90 and a fourth input 100 for receiving the control signal from the controller 92. The display device 70 includes a cathode ray tube (CRT) 102 for producing a graphical display in response to the signals received at the inputs 95, 97, 99, 100. The display device 70 could alternatively include any type of device for producing a graphical display, such as a flat panel display, liquid crystal display (LCD), printer, plotter, etc. The display device 70 preferably also includes a keyboard 104 for entering data, changing data values such as setpoints and tolerances, and manipulating the display produced by the display device. In place of or in addition to the keyboard 104, the display device could also include other input devices such as a mouse, a joystick or voice recognition apparatus. The display device 70 could also include a microprocessor or other controller (not illustrated in FIG. 2) for controlling the display device 70 and producing a graphical display on the CRT 102.

The chiller 66 and associated heat transfer devices (not illustrated in FIG. 2) operate to cool air to a temperature below the ambient temperature. Similarly, the boiler 68 and other heat transfer devices (not illustrated in FIG. 2) operate to warm air to a temperature above the ambient temperature. The systems both operate in a manner well known in the art. The cooled or warmed air is provided to the fan 72 or the fan 88 through building duct work and plenums. In response to the control signal received from the controllers 80, 92, the fans 72, 88 operate to circulate cooled or warmed air in the area under control by respective fan systems.

As will be understood by those ordinarily skilled in the art, the facility management system 60 could be configured in ways other than that shown in FIG. 2. For example, the controllers 80, 92 could be replaced with a single controller in communication with all fan systems. Similarly, the display device 70 could be replaced by a plurality of display devices in communication with different portions of the system 60. Also, other types of information could be conveyed within the system. For example, the fan systems 62, 64 could also include relative humidity in different zones or areas of the building. The control signals produced by the controllers 80, 92, could activate other equipment, such as the chiller 66, the boiler 68 or louvers located in building ducts (not shown) which control air flow. The facility management system 60 illustrated in FIG. 2 is greatly simplified relative to commercial systems.

The controllers 80, 92 automatically attempt to maintain air temperature, relative humidity, or other conditions at a predetermined setpoint. For example, the controller might attempt to maintain the air temperature at 72° F. The sensor signal from the temperature sensors 74, 76, 78, 90 provides an indication of the variation between the sensed, actual condition or temperature and setpoint condition or temperature. When this variation exceeds a predetermined tolerance, the controllers 80, 92 will activate the fans 72, 88 to circulate cooled or warmed air in the area served by the respective fan system. When this variation is less than the predetermined tolerance, the controllers 80, 92 no longer activate the fans 72, 88 to circulate air.

While the setpoint and tolerance are described herein as being predetermined, it is noted that these values may be changed, for example, based upon a programmed schedule. For example, if a building area or zone is unoccupied during a portion of the day, such as overnight, the setpoint temperature may be increased during warm, summer months and decreased during cold, winter months in order to conserve energy. During these energy conservation periods, the tolerance may also be increased to further conserve energy.

The facility management system 60 displays operational information about the system 60 at the display device 70 in a starfield display. A starfield is a pattern of one or more bright regions, having one or more visual attributes, displayed against a dark field, similar to stars seen in the night sky. Alternatively, the starfield can comprise dark regions or regions of any color displayed against a light or contrasting color background.

The starfield metaphor has certain attributes which establish interrelationships and make it universally understood. These attributes include the size of stars, their brightness or color, locational constancy relative to other stars, movement of stars over time, fixation of stars over time, the presence of clusters of stars which change little over time, and the occurrence of more than one time cycle which determines relationships, such as hourly, daily or yearly cycles.

Using these star attributes, single sensor, single indicator (SSSI) data are displayed graphically to communicate system operation information. Recognizable patterns which vary predictably over time and location imply normal operation. If such a pattern cannot be discerned by an operator, the operator is prompted to look for something which causes the pattern to be different. From experience with system problems, the operator may also recognize error patterns. Different patterns correspond to different relationships among operational data for the system.

The basis for the dynamic data in a starfield is a scatter diagram. In the preferred embodiment, the stars are displayed on a grid on which one axis represents time. The other axis is used to cluster the display data in some meaningful way. For example, the second axis might define elements in a facility management system such as the fan systems 62, 64 in the facility management system 60 which share a common chiller loop supplied by the chiller 66. Two or more dimensions of data can be added to each star by using size and color on the display and other visual attributes. Size can also be used to create a perception of depth as well. Further relationships may be shown by clustering stars. One method for doing this is to display secondary stars on a secondary reference grid relative to the main star's position on the primary grid.

In developing a metaphoric abstraction of control system operational information, the objective is to map the data of a complex system, as abstracted to useful information, to the properties of the metaphor. In the exemplary case of a facility management system, the useful information to be evaluated first by an operator is the operating state of a fan system. This information indicates the extent of system control. The space temperature sensor variance from setpoint indicates an operating point where control is achieved.

Figure 3:
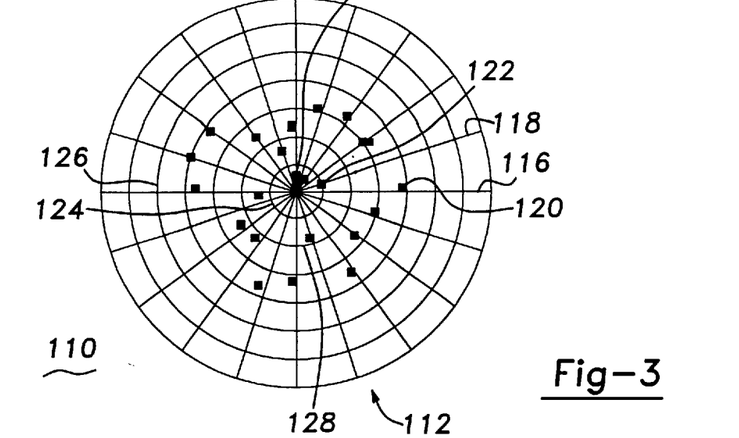
FIG. 3 is a starfield display illustrating operational information for a portion of a facility management system similar to the system illustrated in FIG. 2.

FIG. 3 is a starfield display 110 illustrating operational information for a portion of a facility management system similar to the system 60 illustrated in FIG. 2. In FIG. 3, the starfield display 110 has the form of a radar plot or spider plot 112. The radar plot 112 corresponds to a functional unit such as one of the fan systems 62, 64 in FIG. 2, in a manner to be described.

The radar plot 112 is centered on a primary star 114. The primary star 114 corresponds to an operational unit such as one of the fans 72, 88 in FIG. 2. Surrounding the primary star 114, and radially disposed on the radar plot 112 from the primary star 114, is a plurality of secondary stars. The radar plot 112 includes a plurality of radii such as radius 116 and radius 118. Each of the secondary stars is displayed on one of the radii. Thus, a secondary star 120 is displayed on the radius 116, and a secondary star 122 is displayed on the radius 118.

The primary star 114 has one or more visual attributes corresponding to the operational status of the fan associated with the primary star 114. For example, such visual attributes can include the displayed size, color, shape or fill pattern of the primary star 114. Operational information which can be conveyed by these visual attributes include on or off status and normal or abnormal status of the fan corresponding to the primary star 114.

Each of the secondary stars also has one or more visual attributes, such as size, color or fill pattern, which convey information pertaining to the conditioning of the air in the area served by the fan system corresponding to the associated primary star. For example, associated with each of the temperature sensors is a temperature setpoint, which is the desired ambient temperature (such as 72° F.) for the area where the temperature sensor is located. Also associated with each of the temperature sensors is an actual temperature detected by the temperature sensor, such as 78° F. The variance from setpoint is the difference between the setpoint and the actual measured value, in this case, 6° F. This is an important indication of system control.

The radar plot 112 also includes a plurality of concentric rings, such as ring 124 and ring 126. Each ring corresponds to a variation in actual, measured temperature from setpoint temperature. For example, ring 124 is the first concentric ring radially disposed from the primary star 114. Thus, ring 124 corresponds to temperature variance from setpoint of, for example, 1° F. Similarly, ring 126 is the fifth concentric ring radially disposed from the primary star 114, corresponding to temperature variance from setpoint of, for example, 5° F.

The radial distance from the primary star 114 at the center of the radar plot 112 to an associated secondary star corresponds to the temperature variance between the sensed temperature and the setpoint temperature for the temperature sensor corresponding to the secondary star. Secondary stars close to the primary star, such as secondary star 122, correspond to a temperature sensor which detects a temperature close to the setpoint. As ambient temperatures vary from the setpoint, the secondary stars appear to drift away from the primary star 114 at the center of the radar plot 112.

Thus, the visual attributes such as color and location of each displayed secondary star indicate the direction and magnitude of the variance from the setpoint value. For example, red corresponds to a positive variance or a measured temperature which is too warm relative to the setpoint value. Blue corresponds to a negative variance or a measured temperature which is too cool relative to the setpoint temperature for the temperature sensor associated with that secondary star. A green secondary star indicates that its corresponding area is within a defined comfort range, for example, within ±1° of the setpoint value.

On a monochrome screen or black and white drawing such as FIG. 3, a light fill pattern corresponds to a too-warm variance. A darker fill pattern corresponds to a too-cold variance. Thus, as illustrated in FIG. 3, the primary star 114 has secondary stars 120 and 122. The secondary star 122 is darker in color, to indicate, for example negative variance from setpoint temperature. The secondary star 120 is lighter in color to indicate, for example, positive variance from the setpoint temperature.

Alternative attributes may be given to the features of the radar plot 112, in addition to those already described. For example, secondary stars whose radial distance from the primary star is less than the radial distance corresponding to a prescribed comfort range may be displayed with a first color or shading, and secondary stars whose radial distance from the primary star is greater than the radial distance corresponding to the prescribed comfort range are displayed with a second color or shading. According to this example, then, as illustrated in FIG. 3, secondary stars located within the second concentric ring 128 are shaded to appear dark, and secondary stars outside the second concentric ring 128 are shaded to appear light. This indicates that the secondary stars within the second concentric ring 128 correspond to temperature sensors for which the temperature of the corresponding area is within a predefined comfort range, for example, within ±2° F. of setpoint temperature. Thus, the relative distance between the secondary stars and the primary star provides the operator with an indication of systemic control for the conditioning of air in the space to be controlled.

Figure 4:
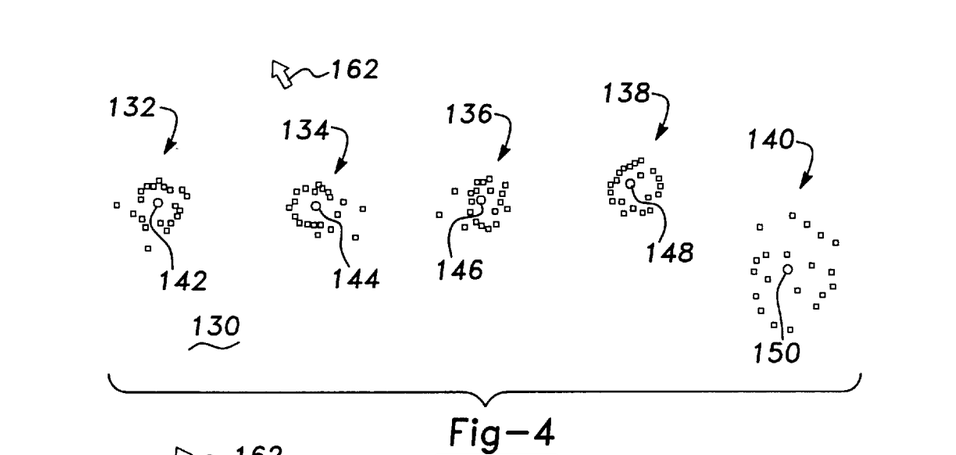
FIG. 4 is a starfield display illustrating operational information for a facility management system similar to that illustrated in FIG. 2.

FIG. 4 is a starfield display 130 illustrating operational information for a facility management system similar to the system 60 illustrated in FIG. 2. The starfield display 130 includes a first cluster 132 of stars, a second cluster 134 of stars, a third cluster 136 of stars, a fourth cluster 138 of stars and a fifth cluster 140 of stars. Each cluster of stars corresponds to a respective functional unit or fan system, such as the first fan system 62 and the second fan system 64 of the facility management system 60 illustrated in FIG. 2. The starfield display associated with the facility management system 60 would have two clusters of stars, each corresponding to one of the fan systems 62, 64.

Each star cluster includes a central or primary star. Thus, the first cluster 132 of stars includes a first primary star 142, the second cluster 134 includes a second primary star 144, the third cluster 136 includes a third primary star 146, the fourth cluster 138 includes a fourth primary star 148 and the fifth cluster 140 includes a fifth primary star 150. Each primary star corresponds to an operational unit or a fan, such as the first fan 72 and the second fan 88 illustrated in FIG. 2 in conjunction with the facility management system 60.

As illustrated in FIG. 4, the primary or fan stars 142, 144, 146, 148, 150 in the starfield display are positioned along the horizontal axis by fan number or some other identifying indication. Alternatively, the primary stars 142, 144, 146, 148, 150 may be grouped so as to convey operational relationships. For example, the fan systems associated with the first three primary stars 142, 144, 146 may share a common chiller loop. The primary stars 142, 144, 146, 148, 150 are positioned along the vertical axis by time, according to when they last changed state during the displayed time period, such as the current day. Thus, the top of the display corresponds to time 0:00 and the bottom of the display corresponds to time 23:59. Alternative time grids could also be used.

Associated with each of the primary stars 142, 144, 146, 148, 150 is a group of one or more secondary stars. Each of the secondary stars corresponds to a sensor such as temperature sensors 74, 76, 78, associated with the fan 72, in FIG. 2. Alternatively, each of the secondary stars could correspond to relative humidity sensors, security sensors, heat sensors or smoke detectors or other devices which detect a condition to be monitored in a facility management system.

Each primary star has one or more visual attributes which communicate operational information. For example, in FIG. 4, primary stars 142, 144, 146 and 148 are larger in size and filled to appear darker relative to primary star 150. The larger size indicates that the fans corresponding to primary stars 142, 144, 146, 148 are turned on, and the fan corresponding to the primary star 150 is turned off. The darker fill pattern indicates that the fans corresponding to primary stars 142, 144, 146, 148 are operating normally, while the lighter fill pattern indicates that the fan 150 is in an abnormal condition.

Each of the secondary stars also has one or more visual attributes, such as size, color or fill pattern, which convey information pertaining to the conditioning of the air in the area served by the fan system corresponding to the associated primary star. In FIG. 4, the secondary stars are displayed in relation to the respective primary stars in the same manner as in FIG. 3. Thus, the secondary stars are displayed on a radar plot centered on an associated primary star. The radii and the concentric rings illustrated in FIG. 3 are not illustrated in FIG. 4 for the sake of clarity. An operator may vary the display to show the radii and concentric rings in the display illustrated in FIG. 4.

Figure 5:
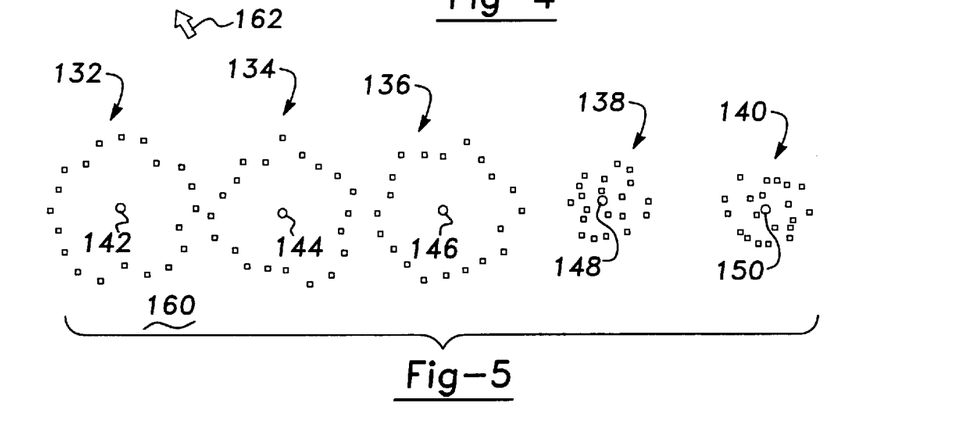
FIG. 5 is a starfield display illustrating operational information for a facility management system similar to that illustrated in FIG. 2.

FIG. 5 is a starfield display 160 illustrating operational information for a facility management system similar to the system 60 illustrated in FIG. 2. FIG. 5 illustrates operational information for the same system illustrated in FIG. 4 but at a different time, under different operating conditions. Thus, elements of the starfield display 160 (FIG. 5) and elements of the starfield display 130 (FIG. 4) are numbered identically.

The starfield display 160 thus includes a first cluster 132 of stars, a second cluster 134 of stars, a third cluster 136 of stars, a fourth cluster 138 of stars and a fifth cluster 140 of stars. The clusters 132, 134, 136, 138, 140 of stars include a first primary star 142, a second primary star 144, a third primary star 146, a fourth primary star 148, and a fifth primary star 150, respectively. Each of the primary stars 142, 144, 146, 148, 150 is surrounded by an associated plurality of secondary stars.

In the starfield displays of FIGS. 4 and 5, information corresponding to operation of the fan systems is abstracted to a comprehensible and useful format for display. For a facility management system such as the system 60 (FIG. 2), information of primary concern to an operator is the fan state and status. By observing the primary stars 142, 144, 146, 148, 150 and the secondary stars associated with the respective primary stars 142, 144, 146, 148, 150, on the starfield display 130 (FIG. 4), the operator can tell at a glance if all of the fan systems are in their proper operational state, and, if not, which fans are not operating properly.

For example, in FIG. 4, the large, dark primary stars 142, 144, 146, 148 representing the first four fans indicate that the fans are in the on state and have a normal status. The tight ring of darkly colored or filled stars for each fan system cluster indicates that the temperature setpoints are being maintained within a defined comfort range. This indicates a system which is under control.

In contrast, the smaller size and lighter fill pattern of the primary star 150 which corresponds to the fifth fan system indicates that the fan's state is off and that its status is abnormal. The cluster of secondary stars associated with the primary star 150 is not in a tight ring corresponding to a band of comfortable temperatures. The light color of the majority of secondary stars in the cluster, taken in conjunction with the increased radial distance from the primary star 150, indicates that sensed temperatures are drifting away from the setpoint temperatures for the corresponding areas and that the fifth fan system is out of control.

Viewing FIG. 4, then, the operator can determine at a glance that the first four fan systems are on, setpoints are being maintained, and the area temperatures are considered comfortable. In contrast, the fifth fan system is off, setpoints are not being maintained and the majority of the area temperatures are too warm.

In FIG. 5, all five fan systems are on, as indicated by the large size of their primary stars. The primary stars are relatively dark in color, indicating they are in a normal state. However, the first three fan systems, corresponding to first cluster 132, second cluster 134 and third cluster 136, do not exhibit the normal tight ring of secondary stars surrounding the primary star and corresponding to a narrow band of comfortable temperatures. The secondary stars in these two systems are all light in color, indicating that the corresponding space temperatures are warmer than their setpoint temperatures. Moreover, the relative radial distances from the primary star to the associated secondary stars in these clusters indicates that they differ from their setpoints by a substantial amount.

The locational property of a starfield provides an interpretation for the situation illustrated in FIG. 5. If the first three fan systems, corresponding to the first cluster 132, the second cluster 134 and the third cluster 136, are supplied by the same chiller, the starfield display indicates they are running normally but that their corresponding space temperature setpoints are not being maintained. From this information, an operator might deduce that there is a problem with the chiller loop. This deduction allows other information to be gathered and corrective action to be taken. Other conclusions can be made based on experience with other patterns in the starfield display.

Other information may also be made available to the operator using the starfield display. As illustrated in FIGS. 4 and 5, the display includes an arrow 162 which may form part of a graphical user interface for allowing the operator to control the display device on which the starfield display 130 is produced. By using a mouse or other device in conjunction with an on-screen indicator such as the displayed arrow 162, in a manner well known in the art, the operator may change the display from the starfield display illustrated in FIG. 5 to call up other information and provide additional detail about operational conditions.

For example, by "clicking on" the first cluster 132, the operator may display detailed operational data associated with the fan system corresponding to the first cluster 132. Detailed textual information about system operating conditions and temperature setpoints, as well as locational and identifying information, or trend graphs or other graphical information may be displayed in this manner.

Referring again to FIG. 1, a further exemplary embodiment of the control system 10 is an irrigation system. Such an irrigation system might be used to automatically control irrigation of one or more fields or other areas.

In this embodiment, the first functional unit 12 controls irrigation in a first field or area of a field and the second functional unit 14 controls irrigation in a second field or area of a field. The sensors 22, 24, 26 detect the relative moisture content of soil in the first field and produce a sensor signal indicative of moisture content. In this embodiment, the operational unit 20 comprises a pump and associated means for delivering water to the first field in response to a control signal from the controller 18. The controller 18 maintains a predetermined moisture level setpoint and a predetermined moisture level tolerance. When the controller 18 determines from the sensor signal that the moisture level is no longer within the tolerance, the controller 18 provides the control signal to activate the pump. The pump delivers water to the field until the controller 18 determines, in response to the sensor signal from the sensors 22, 24, 26, that the moisture content of the soil is within a predetermined tolerance. The second functional unit 14 operates similarly to control soil moisture level in the second field.

As can be seen from the foregoing, the present invention provides an apparatus and method for displaying operational information for a complex control system. By abstracting the data to be presented into the metaphor of a starfield, large amounts of data can be presented in a compact, easily understood display. The relationship between operational parameters of individual components of the system may be readily discerned. System state and status information are also clearly displayed.

For displaying system status, the system uses the starfield metaphor, which is familiar to virtually all operators and has attributes which make the starfield metaphor universally understood. Elements of the starfield have differing visual attributes corresponding to differing operational states or conditions of the associated elements in the control system. Through experience with starfield displays produced in response to a variety of conditions, an operator can readily identify operational problems before they occur and act to correct potential problems. Also, data corresponding to a library of known pattern may be stored to allow study of performance of the system and operator training, as well as other uses.

While particular embodiments of the present invention have been shown and described, modifications may be made. For example, different visual attributes other than size, color, etc. may be used to represent operational attributes of system components. Similarly, rather than clustering related system components along the horizontal axis as illustrated in FIGS. 3 and 5, related stars corresponding to related system elements may be clustered in "galaxies" or in any other fashion to improve operator comprehension and diagnosis. Stars may be connected with lines on the display to help an operator determine patterns of warmth, coolness or some other condition.

Therefore, it is intended in the appended claims to cover all such changes and modifications which fall within the true spirit and scope of the invention.

What is claimed is:

1. A control system comprising:
 a plurality of sensors configured to produce a plurality of sensor signals, each respective sensor producing a respective sensor signal in response to a respective sensed condition;
 a plurality of controllers configured to produce a plurality of control signals in response to one or more sensor signals, each respective controller producing at least one control signal;
 a plurality of operational units, each respective operational unit being configured for connection to a respective controller for receiving one or more control signals, each respective operational unit configured to produce a control effect in response to the one or more control signals; and
 a display device being configured for connection to the plurality of sensors and the plurality of controllers and producing a starfield display in response to the plurality of sensor signals and the plurality of control signals.

2. A control system as defined in claim 1 wherein the starfield display comprises a plurality of primary stars and a plurality of secondary stars, each respective primary star corresponding to a respective operational unit and each respective secondary star corresponding to a respective sensor, each respective primary star having a first visual characteristic in response to a respective control signal and each respective secondary star having a second visual characteristic in response to a respective sensor signal.

3. A control system as defined in claim 2 wherein at least one sensor is associated with one operational unit and wherein the at least one secondary star corresponding to the at least one sensor is associated with the primary star corresponding to the one controller.

4. A control system as defined in claim 3 wherein the display device displays the respective primary star positioned on a horizontal axis and a vertical axis, the horizontal axis corresponding to a first system variable and the vertical axis corresponding to a second system variable.

5. A control system as defined in claim 4 wherein the horizontal axis corresponds to an operational unit identifier, the controller identifier being unique to the respective operational unit.

6. A control system as defined in claim 3 wherein the display device displays the at least one secondary star on a radar plot with the respective primary star at the center of the radar plot.

7. A control system as defined in claim 3 wherein the display device displays the at least one secondary star a predetermined distance from the respective primary star, the predetermined distance being determined in response to the respective sensor signal.

8. A method for providing operational information in a facility management system, the facility management system including a plurality of functional units, a controller, and a display device, the method comprising the steps of:
receiving from at least one functional unit a sensor signal representative of a sensed condition; and
producing a starfield display on the display device in response to the sensor signal.

9. A method for providing operational information in a facility management system as recited in claim 8 wherein the display producing step includes displaying on the display device a plurality of stars, each respective star of the plurality of stars corresponding to a respective functional unit of the plurality of functional units.

10. A method for providing operational information in a facility management system as recited in claim 9 wherein each functional unit has at least one operational state and wherein each star has at least one visual attribute corresponding to the at least one operational state, the sensor signal conveying the at least one operational state.

11. A method for providing operational information in a facility management system as recited in claim 10 wherein the at least one visual attribute includes a color, and wherein the display producing step includes displaying on the display device each star with one of a first color and a second color, the first color corresponding to a first operational state of the corresponding functional unit and the second color corresponding to a second operational state of the corresponding functional unit.

12. A method for providing operational information in a facility management system as recited in claim 10 wherein the at least one visual attribute includes a displayed size, and wherein the display producing step includes displaying on the display device each star with one of a first displayed size and a second displayed size, the first displayed size corresponding to a first operational state of the corresponding functional unit and the second displayed size corresponding to a second operational state of the corresponding functional unit.

13. A method for providing operational information in a facility management system as recited in claim 8 wherein the plurality of functional units includes a plurality of air handling systems, each air handling system including at least one fan and at least one associated space temperature control device, and wherein the display producing step includes displaying on the display device at least one primary star and at least one secondary star associated with each primary star, each primary star corresponding to a fan and each secondary star corresponding to a space temperature control device.

14. A method for providing operational information in a facility management system as recited in claim 13 wherein each primary star has a first visual attribute and wherein each secondary star has a second visual attribute.

15. A method for providing operational information in a facility management system as recited in claim 14 wherein the display producing step includes displaying each secondary star adjacent to each associated primary star, each secondary star being displayed a predetermined radial distance from each associated primary star.

16. A method for providing operational information in a facility management system as recited in claim 15 wherein the space temperature control device detects an ambient temperature and provides an indication corresponding to variation of the ambient temperature from a setpoint temperature, the sensor signal being representative of the indication, and wherein the predetermined distance corresponds to the indication in a predetermined manner.

17. A facility management system comprising:
one or more sensors responsive to an environmental condition configured to produce a sensor signal;
one or more fans responsive to a control signal configured to change the environmental condition;
a controller configured to be coupled to the one or more sensors and the one or more fans, the controller configured to generate the control signal in response to the sensor signal; and
a display device configured to be coupled to the one or more sensors and to the controller, the display device configured to produce a starfield display in response to the sensor signal and the control signal.

18. A facility management system as defined in claim 17 wherein the starfield display comprises a plurality of primary stars and a plurality of secondary stars, each respective primary star corresponding to a respective operational unit of the one or more operational units and each respective secondary star corresponding to a respective sensor of the one or more sensors, each respective primary star having a first visual characteristic in response to the control signal and each respective secondary star having a second visual characteristic in response to the sensor signal.

19. A facility management system as defined in claim 18 wherein at least one sensor is associated with one fan and wherein the at least one secondary star corresponding to the at least one sensor is associated with the primary star corresponding to the one fan.

20. A facility management system as defined in claim 19 wherein the starfield display includes each respective primary star positioned on a horizontal axis and a vertical axis, the horizontal axis corresponding to a first system variable and the vertical axis corresponding to a second system variable.

21. A facility management system as defined in claim 20 wherein the vertical axis corresponds to an elapsed time period.

22. A facility management system as defined in claim 21 wherein the starfield display includes the at least one secondary star displayed on a radar plot with its associated respective primary star at the center of the radar plot.

23. A facility management system as defined in claim 22 wherein the starfield display includes the at least one secondary star displayed a predetermined distance from the associated respective primary star, the predetermined distance being determined in response to the sensor signal.

\* \* \* \* \*